US012769349B2

(12) United States Patent
Yuh

(10) Patent No.: US 12,769,349 B2
(45) Date of Patent: Oct. 20, 2026

(54) BIAS PROVISION CIRCUITS AND METHODS FOR FORMING THE SAME

(71) Applicant: Taiwan Semiconductor Manufacturing Company, Ltd., Hsinchu (TW)

(72) Inventor: Perng-Fei Yuh, Hsinchu City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 15 days.

(21) Appl. No.: 18/812,335

(22) Filed: Aug. 22, 2024

(65) Prior Publication Data

US 2026/0056567 A1 Feb. 26, 2026

(51) Int. Cl.
*G05F 1/59* (2006.01)

(52) U.S. Cl.
CPC .................................... *G05F 1/59* (2013.01)

(58) Field of Classification Search
CPC ............... G05F 1/59; G05F 3/26; G05F 3/262
USPC ........................................................ 327/538
See application file for complete search history.

(56) References Cited

U.S. PATENT DOCUMENTS

| | | | | |
|---|---|---|---|---|
| 8,080,988 | B2 | 12/2011 | Hurtz et al. | |
| 8,324,878 | B2 | 12/2012 | Lee | |
| 2022/0342436 | A1* | 10/2022 | Yuh | G05F 3/24 |
| 2023/0066618 | A1* | 3/2023 | Yuh | G11C 5/147 |

FOREIGN PATENT DOCUMENTS

| | | | |
|---|---|---|---|
| CN | 108664067 | A | 10/2018 |
| JP | 2009-003835 | A | 1/2009 |
| TW | I656710 | B | 4/2019 |

OTHER PUBLICATIONS

Office Action issued in Taiwan Appl. No. 113150025 dated Dec. 15, 2025.

* cited by examiner

*Primary Examiner* — Regis J Betsch
*Assistant Examiner* — Amit R Bhatia
(74) *Attorney, Agent, or Firm* — Foley & Lardner LLP

(57) ABSTRACT

A circuit includes a first diode-connected transistor; a first impedance element connected between a first source/drain terminal of the first diode-connected transistor and a first supply voltage; a first transistor, wherein the first diode-connected transistor and the first transistor have their gate terminals connected to each other; a second diode-connected transistor; a second impedance element connected between a second source/drain terminal of the first diode-connected transistor and a first source/drain terminal of the second diode-connected transistor, with a second source/drain terminal of the second diode-connected transistor coupled to a second supply voltage; and a second transistor, wherein the second diode-connected transistor and the second transistor have their gate terminals connected to each other. The first diode-connected transistor and the second diode-connected transistor have a first conductive type.

20 Claims, 13 Drawing Sheets

BIAS PROVISION CIRCUITS AND METHODS FOR FORMING THE SAME

BACKGROUND

The semiconductor industry has experienced rapid growth due to continuous improvements in the integration density of a variety of electronic components (e.g., transistors, diodes, resistors, capacitors, etc.). For the most part, this improvement in integration density has come from repeated reductions in minimum feature size, which allows more components to be integrated into a given area.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
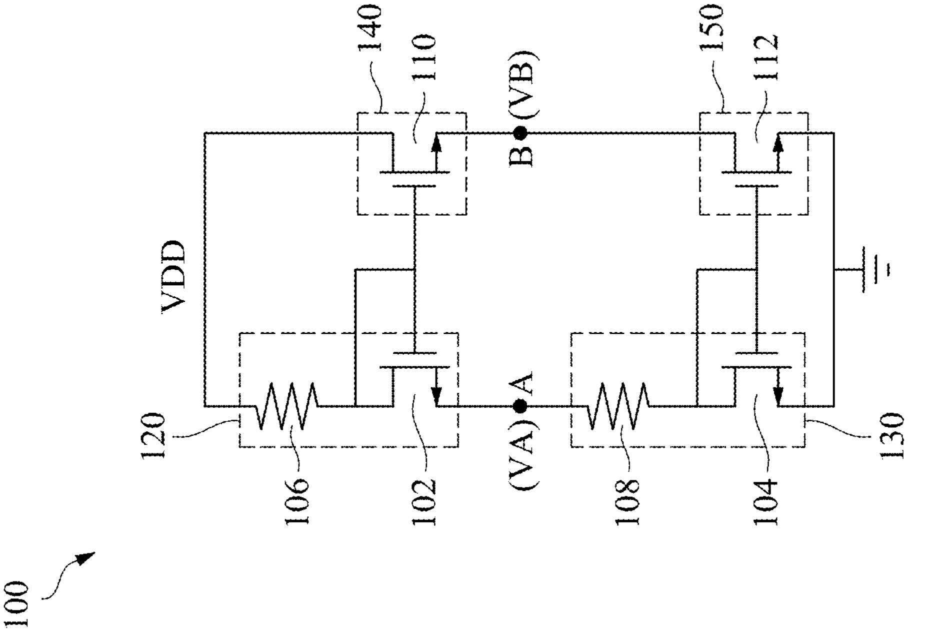
FIGS. 1, 2, 3, 4, 5, 6, 7, 8, 9, 10, 11, 12, 13, 14, 15, 16, 17, 18, and 19 each illustrate an example circuit diagram of a bias provision circuit, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In general, an electronic device, e.g., an integrated chip, may include various components for various functions. For example, an electronic device may include at least one of an eFuse, one-time programmable memory, a dynamic random-access memory (DRAM), core-only high voltage circuits, or a processor. Different components in an electronic device may work with different bias voltages. Further, in accordance with the ever increasingly scaling trend to integrate more components into one chip, components to efficiently operate under a low power supply voltage condition is desired. In this regard, the fraction of a supply voltage (e.g., VDD/2) is typically provided as a bias voltage for operation. For example, in a DRAM device, bit lines of the DRAM device may be pre-charged to or biased at VDD/2 as a reference voltage for the following read/write operation.

The present disclosure provides various embodiments of a bias provision circuit that can provide one or more bias voltages, each of which may be a fraction of a supply voltage (e.g., VDD). For example, the bias provision circuit, as disclosed herein, may include a first reference section and a second reference section coupled between a first supply voltage (e.g., VDD) and a second supply voltage (e.g., ground) to divide a difference between the first and second supply voltages. The bias provision circuit can provide a bias voltage (e.g., a fraction of VDD) at a node connected between the first reference section and second reference section. The first reference section can include a first impedance element (e.g., a first resistor) and a first diode-connected transistor, and the second reference section can include a second impedance element (e.g., a second resistor) and a second diode-connected transistor. In various embodiments of the present disclosure, the first diode-connected transistor and the second diode-connected transistor have the same conductive type, e.g., both in n-type or both in p-type. With the same conductive type, a variation of the bias voltage, which commonly results from respective threshold voltages of transistors in the different conductive types, can be advantageously minimized. Accordingly, a fractional bias volage can be accurately provided by the bias provision circuit, while being insensitive to Process-Voltage-Temperature (PVT) variation.

FIG. 1 illustrates an example circuit diagram of a bias provision circuit 100, in accordance with some embodiments. The bias provision circuit 100, coupled between supply voltages VDD and ground, is configured to provide a fraction of VDD, e.g., VDD/2. It should be understood that the circuit diagram of FIG. 1 is provided for illustrative purposes, and is not intended to limit the scope of the present disclosure. Accordingly, the bias provision circuit 100 shown in FIG. 1 can include any of various other components while remaining within the scope of the present disclosure.

As shown, the bias provision circuit 100 includes a first diode-connected transistor 102, a second diode-connected transistor 104, a first impedance element 106, a second impedance element 108, a first transistor 110, and a second transistor 112. In some embodiments, the first impedance element 106 and the second impedance element 108 can each include a resistor, a transistor, a diode, or any other element that can provide impedance for the bias provision circuit 100. In the illustrative example of FIG. 1, the first impedance element 106 is implemented as a first resistor and the second impedance element 108 is implemented as a second resistor, wherein the first and second resistors have an identical resistance. In some embodiments, the first diode-connected transistor 102 and the second diode-connected transistor 104 have an identical conductive type, e.g., both in n-type in the example of FIG. 1. Further, the first transistor 110 and the first diode-connected transistor 102 have the same conductive type, and the second transistor 112 and the second diode-connected transistor 104 have the same conductive type.

The bias provision circuit 100 has its components coupled between a first supply voltage (e.g., VDD) and a second supply voltage (e.g., ground). For example, the first impedance element 106 has a first terminal connected to VDD and a second terminal connected to a first source/drain terminal of the first diode-connected transistor 102, which is also connected to a gate terminal of the first diode-connected transistor 102; a second source/drain terminal of the first diode-connected transistor 102 is connected to a first terminal of the second impedance element 108 at a common node "A," which presents a first voltage "$V_A$;" the second impedance element 108 further has a second terminal connected to a first source/drain terminal of the second diode-connected transistor 104, which is also connected to a gate terminal of the second diode-connected transistor 104; and a second source/drain terminal of the second diode-connected transistor 104 is connected to ground. Further, the first transistor 110 has its gate terminal connected to the gate terminal of the first diode-connected transistor 102, with its first and second source/drain terminals connected to VDD and connected at a common node "B," which presents a second voltage "$V_B$," respectively; and the second transistor 112 has its gate terminal connected to the gate terminal of the second diode-connected transistor 104, with its first and second source/drain terminals connected at the common node B and connected to ground, respectively.

In some embodiments, the first diode-connected transistor 102 and the first impedance element 106 may operatively serve as a first reference section 120, the second diode-connected transistor 104 and the second impedance element 108 may operatively serve as a second reference section 130, the first transistor 110 may operatively serve as a driving section 140, and the second transistor 112 may operatively serve as a bias section 150. Generally, a reference section is configured to provide a reference voltage for a bias voltage, a bias section is configured to provide the bias voltage based on the reference voltage, and a driving section is configured to source or sink the bias voltage, according to various embodiments of the present disclosure.

In some embodiments, the first transistor 110 and the first diode-connected transistor 102 may collectively operate as a current mirror, and the second transistor 112 and the second diode-connected transistor 104 may collectively operate as another current mirror. The current mirror formed by the transistors 102 and 110 can be configured to source current for the node B. With the first reference section being substantially similar to the second reference section (e.g., the impedance elements 106 and 108 having the same resistance or otherwise impedance), the first voltage $V_A$, which may sometimes be referred to as a reference voltage, can be configured as around VDD/2. Further, with the first driving section and second driving section substantially similar to the first reference section and the second reference section, respectively, (e.g., the first transistor 110 and the first diode-connected transistor 102 having the same threshold voltage, the second transistor 112 and the second diode-connected transistor 104 having the same threshold voltage), the second voltage $V_B$, which may sometimes be referred to as a bias voltage, can be substantially similar to the first (reference) voltage $V_A$. That is, $V_A \approx V_B \approx$VDD/2.

Figure 2:
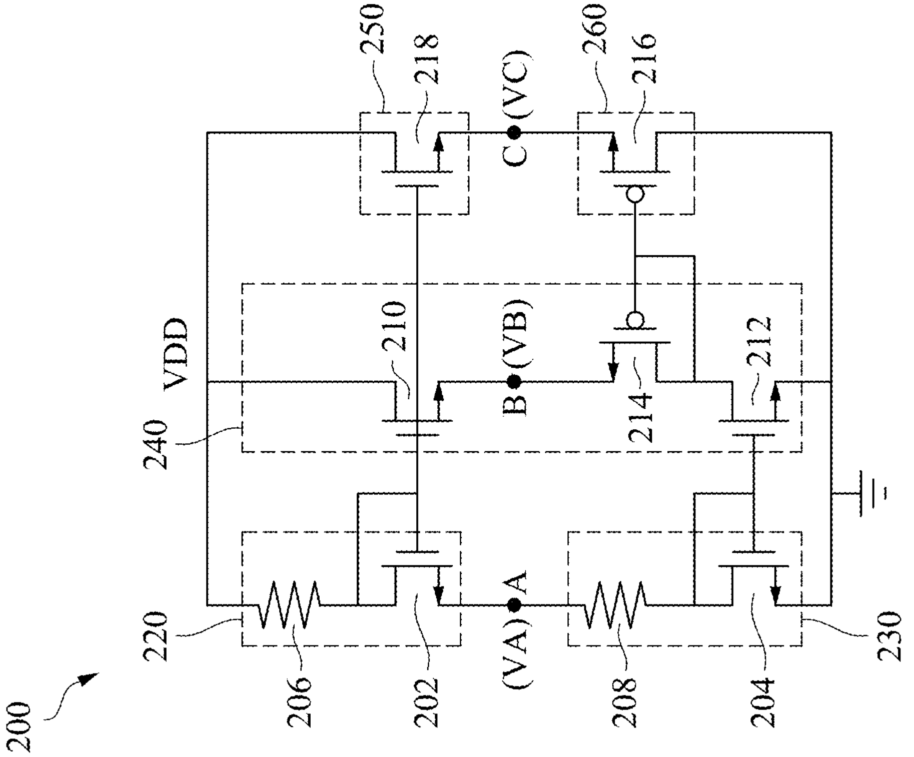

FIG. 2 illustrates an example circuit diagram of another bias provision circuit 200, in accordance with some embodiments. The bias provision circuit 200 is substantially similar to the bias provision circuit 100 (FIG. 1), except that the bias provision circuit 200 further includes some other components (or sections). Accordingly, the following discussion of the bias provision circuit 200 will be focused on the difference between the bias provision circuits 100 and 200. It should be understood that the circuit diagram of FIG. 2 is provided for illustrative purposes, and is not intended to limit the scope of the present disclosure. Accordingly, the bias provision circuit 200 shown in FIG. 2 can include any of various other components while remaining within the scope of the present disclosure.

As shown, in addition to a first diode-connected transistor 202, a second diode-connected transistor 204, a first impedance element 206, a second impedance element 208, a first transistor 210, and a second transistor 212 (which are substantially similar to the first diode-connected transistor 102, second diode-connected transistor 104, first impedance element 106, second impedance element 108, first transistor 110, and second transistor 112, respectively), the bias provision circuit 200 includes transistors 214, 216, and 218. The transistor 218 can have the same conductive type as the transistor 210 (e.g., n-type), while the transistors 214 and 216 may have the opposite conductive type (e.g., p-type).

In some embodiments, the transistor 218 can have its gate terminal connected to the gate terminals of the transistor 210 and the diode-connected transistor 202, a first source/drain terminal connected to VDD, and a second source/drain terminal connected to the transistor 216. The transistors 214 and 216 may have their gate terminals connected to each other, and the transistors 214 and 216 may each have one of its source/drain terminals connected to the common node B and another common node "C," which presents a third voltage "$V_C$." The transistors 214 and 216 may collectively operate as yet another current mirror. In some embodiments, the first diode-connected transistor 202 and the first impedance element 206 may operatively serve as a first reference section 220, the second diode-connected transistor 204 and the second impedance element 208 may operatively serve as a second reference section 230, the transistors 210-214 may operatively serve as a bias section 240, the transistor 218 may operatively serve as a first driving section 250, and the transistor 216 may operatively serve as a second driving section 260. The first driving section 250 can source the third voltage $V_C$, and the second driving section 260 can sink the third voltage $V_C$. The third voltage $V_C$ (a bias voltage) can be substantially similar to the second voltage $V_B$ (another bias voltage), which is substantially similar to the first voltage $V_A$ (a reference voltage). That is, $V_A \approx V_B \approx V_C \approx$VDD/2.

Figure 3:
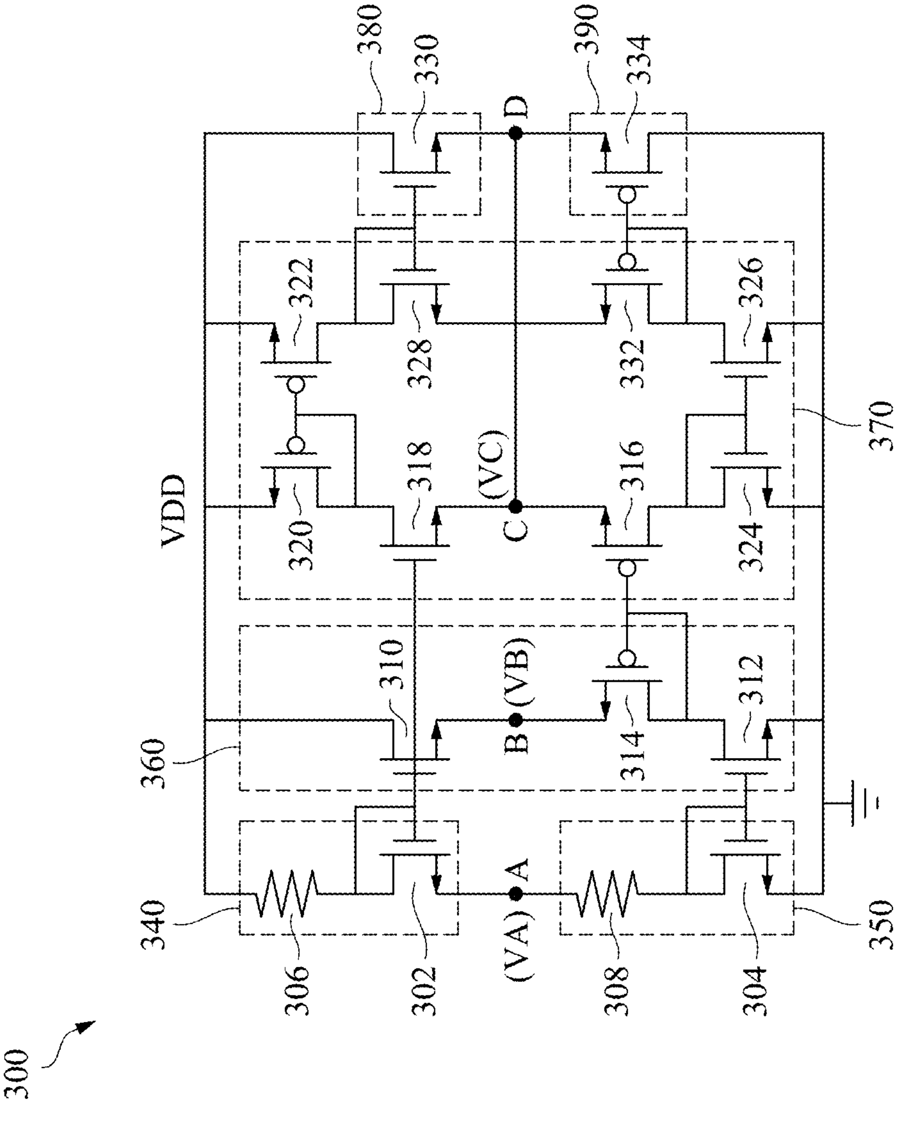

FIG. 3 illustrates an example circuit diagram of yet another bias provision circuit 300, in accordance with some embodiments. The bias provision circuit 300 is substantially similar to the bias provision circuit 200 (FIG. 2), except that the bias provision circuit 300 further includes some other components (or sections). Accordingly, the following discussion of the bias provision circuit 300 will be focused on the difference between the bias provision circuits 200 and 300. It should be understood that the circuit diagram of FIG. 3 is provided for illustrative purposes, and is not intended to limit the scope of the present disclosure. Accordingly, the bias provision circuit 300 shown in FIG. 3 can include any of various other components while remaining within the scope of the present disclosure.

As shown, in addition to a first diode-connected transistor 302, a second diode-connected transistor 304, a first impedance element 306, a second impedance element 308, and transistors 310 to 318 (which are substantially similar to the first diode-connected transistor 202, second diode-connected transistor 204, first impedance element 206, second impedance element 208, and transistors 210 to 218, respectively), the bias provision circuit 300 includes transistors 320, 322, 324, 326, 328, 330, 332, and 334. The transistor 320-322 and 332-334 can have the same conductive type (e.g., p-type), while the transistors 324-326 and 328-330 may have the opposite conductive type (e.g., n-type).

In some embodiments, the transistors 320 and 322 can have their gate terminals connected to each other, the transistors 324 and 326 can have their gate terminals connected to each other, the transistors 328 and 330 can have their gate terminals connected to each other, and the transistors 332 and 334 can have their gate terminals connected to each other. The pair of transistors 320-322, 324-326, 328-330, and 332-334 may each collectively operate as a current mirror. The transistor 330 and transistor 334 may each have one of its source/drain terminals connected to each other at a common node "D," which is connected to the common node C (thereby presenting the third voltage $V_C$). In some embodiments, the first diode-connected transistor 302 and the first impedance element 306 may operatively serve as a first reference section 340, the second diode-connected transistor 304 and the second impedance element 308 may operatively serve as a second reference section 350, the transistors 310-314 may operatively serve as a bias section 360, the transistors 316-328 and 332 may operatively serve as a gain section 370, the transistor 330 may operatively serve as a first driving section 380, and the transistor 334 may operatively serve as a second driving section 390. The first driving section 380 can source the third voltage $V_C$, and the second driving section 390 can sink the third voltage $V_C$. Further, the gain section is configured to provide an enlarged $V_{gs}$ swing for the driving section that sources/sinks a bias voltage during a transition state, which advantageously improves buffer capability of the driving section, according to various embodiments of the present disclosure. The third voltage $V_C$ (a bias voltage) can be substantially similar to the second voltage $V_B$ (another bias voltage), which is substantially similar to the first voltage $V_A$ (a reference voltage). That is, $V_A \approx V_B \approx V_C \approx VDD/2$.

Figure 5:
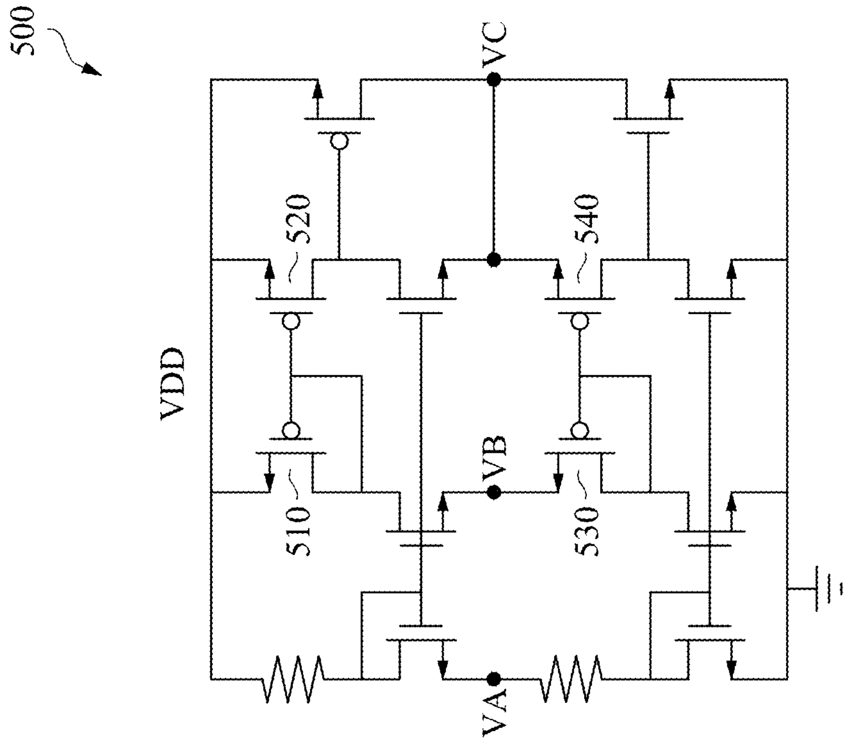
Figure 4:
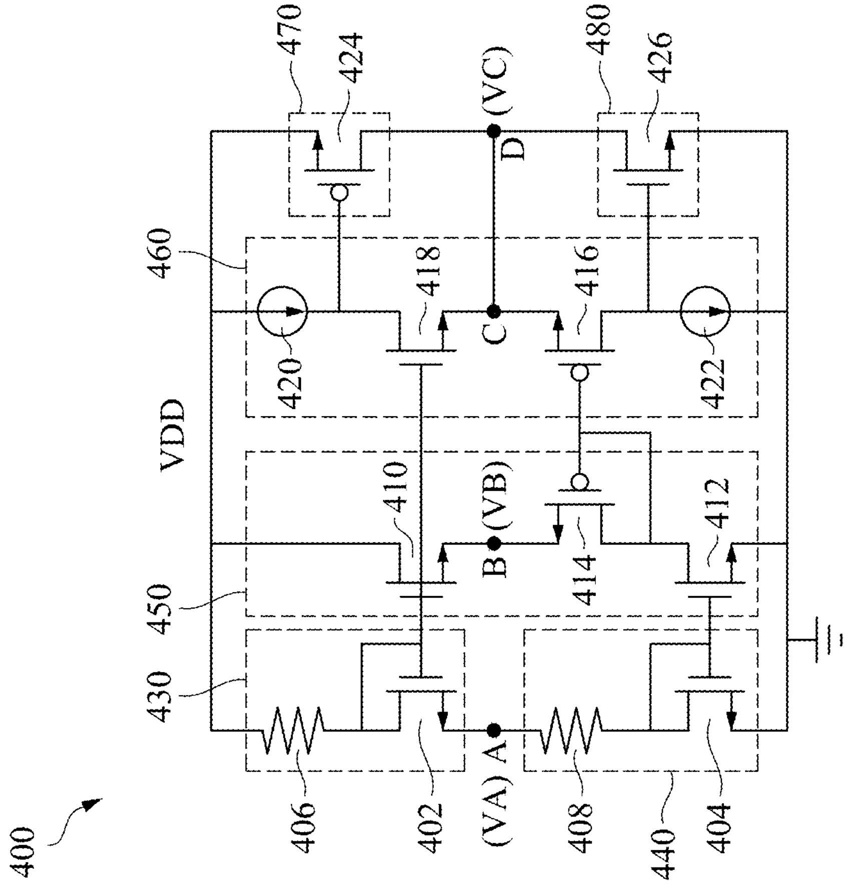

FIG. 4 illustrates an example circuit diagram of yet another bias provision circuit 400, in accordance with some embodiments. The bias provision circuit 400 is substantially similar to the bias provision circuit 200 (FIG. 2), except that the bias provision circuit 400 further includes some other components (or sections). FIG. 5 illustrates another example circuit diagram, with some of the components of the bias provision circuit 400 implemented down to a transistor level. Accordingly, the following discussion of the bias provision circuit 400/500 will be focused on the difference between the bias provision circuits 200 and 400/500. It should be understood that the circuit diagrams of FIGS. 4-5 are provided for illustrative purposes, and are not intended to limit the scope of the present disclosure. Accordingly, the bias provision circuit 400 (FIG. 4) and bias provision circuit 500 (FIG. 5) can each include any of various other components while remaining within the scope of the present disclosure.

As shown, in addition to a first diode-connected transistor 402, a second diode-connected transistor 404, a first impedance element 406, a second impedance element 408, and transistors 410 to 418 (which are substantially similar to the first diode-connected transistor 202, second diode-connected transistor 204, first impedance element 206, second impedance element 208, and transistors 210 to 218, respectively), the bias provision circuit 400 includes a first current source 420, a second current source 422, and transistors 424 and 426. The first current source 420 can be formed by transistors 510 and 520, and the second current source 422 can be formed by transistors 530 and 540, as shown in FIG. 5. The transistor 424 and 510-540 can have the same conductive type (e.g., p-type), while the transistor 426 may have the opposite conductive type (e.g., n-type).

In some embodiments, the first diode-connected transistor 402 and the first impedance element 406 may operatively serve as a first reference section 430, the second diode-connected transistor 404 and the second impedance element 408 may operatively serve as a second reference section 440, the transistors 410-414 and the current source 420-422, in part (e.g., the transistors 510 and 530), may operatively serve as a bias section 450, the current sources 420-422, in part (e.g., the transistors 520 and 540), and transistors 416-418 may operatively serve as a gain section 460, the transistor 424 may operatively serve as a first driving section 470, and the transistor 426 may operatively serve as a second driving section 480. The first driving section 470 can source the third voltage $V_C$, and the second driving section 480 can sink the third voltage $V_C$. Further, the gain section is configured to provide an enlarged $V_{gs}$ swing for the driving section that sources/sinks a bias voltage during a transition state, which advantageously improves buffer capability of the driving section, according to various embodiments of the present disclosure. The third voltage $V_C$ (a bias voltage) can be substantially similar to the second voltage $V_B$ (another bias voltage), which is substantially similar to the first voltage $V_A$ (a reference voltage). That is, $V_A \approx V_B \approx V_C \approx VDD/2$.

Figure 6:
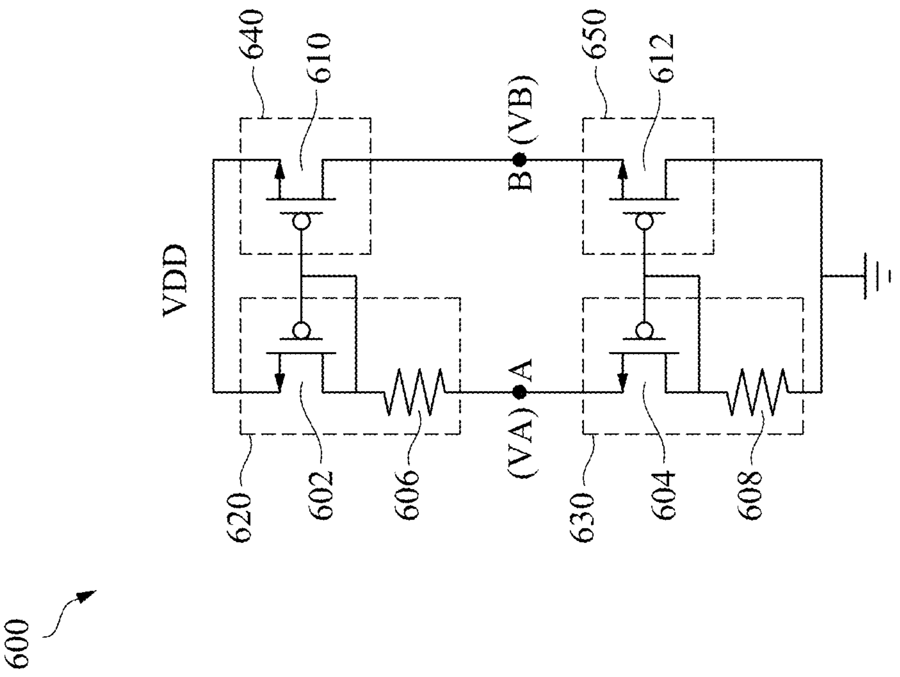

FIG. 6 illustrates an example circuit diagram of yet another bias provision circuit 600, in accordance with some embodiments. The bias provision circuit 600 is substantially similar to the bias provision circuit 100 (FIG. 1), except that the components of the bias provision circuit 600 have the opposite conductive type. Accordingly, the following discussion of the bias provision circuit 600 will be focused on the difference between the bias provision circuits 100 and 600. It should be understood that the circuit diagram of FIG. 6 is provided for illustrative purposes, and is not intended to limit the scope of the present disclosure. Accordingly, the bias provision circuit 600 shown in FIG. 6 can include any of various other components while remaining within the scope of the present disclosure.

As shown, the bias provision circuit 600 includes a first diode-connected transistor 602, a second diode-connected transistor 604, a first impedance element 606, a second impedance element 608, a first transistor 610, and a second transistor 612. In some embodiments, the first impedance element 606 and the second impedance element 608 can each include a resistor, a transistor, a diode, or any other element that can provide impedance for the bias provision circuit 600. In the illustrative example of FIG. 6, the first impedance element 606 is implemented as a first resistor and the second impedance element 608 is implemented as a second resistor, wherein the first and second resistors have an identical resistance. In some embodiments, the first diode-connected transistor 602 and the second diode-connected transistor 604 have an identical conductive type, e.g., both in p-type in the example of FIG. 6. Further, the first transistor 610 and the first diode-connected transistor 602 have the same conductive type, and the second transistor 612 and the second diode-connected transistor 604 have the same conductive type.

The bias provision circuit 600 has its components coupled between a first supply voltage (e.g., VDD) and a second supply voltage (e.g., ground). For example, the first impedance element 606 has a first terminal connected to VDD and a second terminal connected to a first source/drain terminal of the first diode-connected transistor 602, which is also connected to a gate terminal of the first diode-connected transistor 602; a second source/drain terminal of the first diode-connected transistor 602 is connected to a first terminal of the second impedance element 608 at a common node "A," which presents a first voltage "$V_A$;" the second impedance element 608 further has a second terminal connected to a first source/drain terminal of the second diode-connected transistor 604, which is also connected to a gate terminal of the second diode-connected transistor 604; and a second source/drain terminal of the second diode-connected transistor 604 is connected to ground. Further, the first transistor 610 has its gate terminal connected to the gate terminal of the first diode-connected transistor 602, with its first and second source/drain terminals connected to VDD and connected at a common node "B," which presents a second voltage "$V_B$," respectively; and the second transistor 612 has its gate terminal connected to the gate terminal of the second diode-connected transistor 604, with its first and second source/drain terminals connected at the common node B and connected to ground, respectively.

In some embodiments, the first diode-connected transistor 602 and the first impedance element 606 may operatively serve as a first reference section 620, the second diode-connected transistor 604 and the second impedance element 608 may operatively serve as a second reference section 630, the first transistor 610 may operatively serve as a driving section 640, and the second transistor 612 may operatively serve as a bias section 650. Generally, a reference section is configured to provide a reference voltage for a bias voltage, a bias section is configured to provide the bias voltage based on the reference voltage, and a driving section is configured to source or sink the bias voltage, according to various embodiments of the present disclosure. The second voltage $V_B$, which may sometimes be referred to as a bias voltage, can be substantially similar to the first voltage $V_A$, which may sometimes be referred to as a reference voltage. That is, $V_A \approx V_B \approx VDD/2$.

Figure 7:
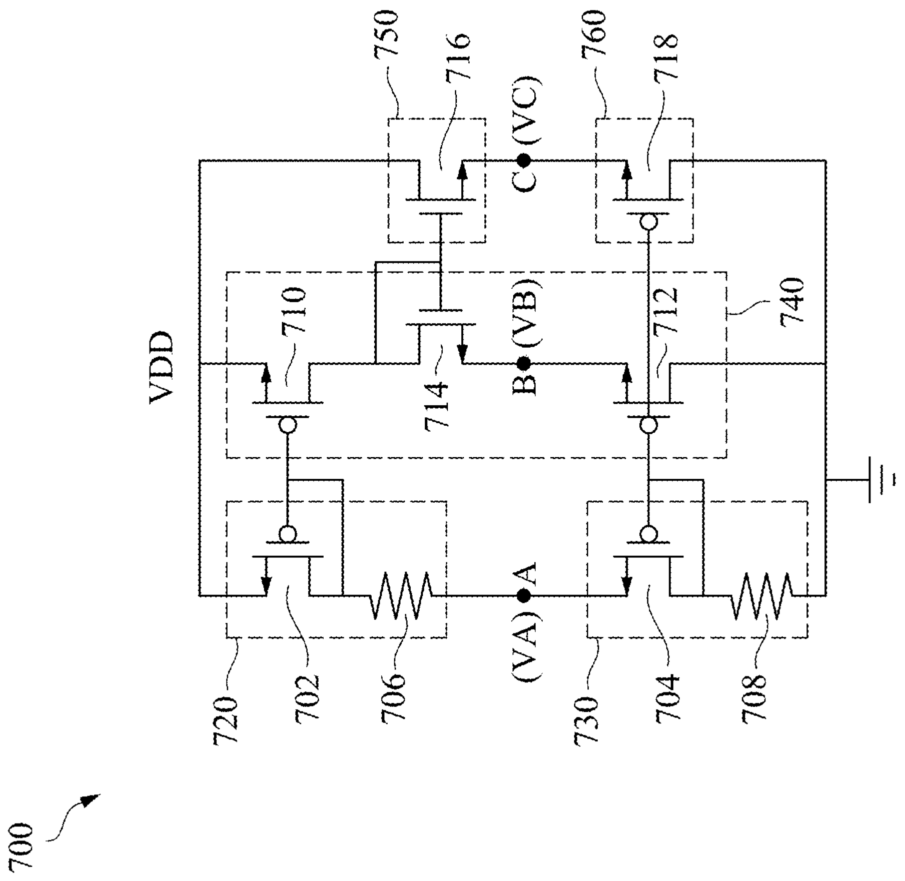

FIG. 7 illustrates an example circuit diagram of yet another bias provision circuit 700, in accordance with some embodiments. The bias provision circuit 700 is substantially similar to the bias provision circuit 600 (FIG. 6), except that the bias provision circuit 700 further includes some other components (or sections). Accordingly, the following discussion of the bias provision circuit 700 will be focused on the difference between the bias provision circuits 600 and 700. It should be understood that the circuit diagram of FIG. 7 is provided for illustrative purposes, and is not intended to limit the scope of the present disclosure. Accordingly, the bias provision circuit 700 shown in FIG. 7 can include any of various other components while remaining within the scope of the present disclosure.

As shown, in addition to a first diode-connected transistor 702, a second diode-connected transistor 704, a first impedance element 706, a second impedance element 708, a first transistor 710, and a second transistor 712 (which are substantially similar to the first diode-connected transistor 602, second diode-connected transistor 604, first impedance element 606, second impedance element 608, first transistor 610, and second transistor 612, respectively), the bias provision circuit 700 includes transistors 714, 716, and 718. The transistor 718 can have the same conductive type as the transistor 712 (e.g., p-type), while the transistors 714 and 716 may have the opposite conductive type (e.g., n-type).

In some embodiments, the transistor 718 can have its gate terminal connected to the gate terminals of the transistor 712 and the diode-connected transistor 704, a first source/drain terminal connected to ground, and a second source/drain terminal connected to the transistor 716. The transistors 714 and 716 may have their gate terminals connected to each other, and the transistors 714 and 716 may each have one of its source/drain terminals connected to the common node B and another common node "C," which presents a third voltage "$V_C$." The transistors 714 and 716 may collectively operate as yet another current mirror. In some embodiments, the first diode-connected transistor 702 and the first impedance element 706 may operatively serve as a first reference section 720, the second diode-connected transistor 704 and the second impedance element 708 may operatively serve as a second reference section 730, the transistors 710-714 may operatively serve as a bias section 740, the transistor 716 may operatively serve as a first driving section 750, and the transistor 718 may operatively serve as a second driving section 760. The first driving section can source the third voltage $V_C$, and the second driving section can sink the third voltage $V_C$. The third voltage $V_C$ (a bias voltage) can be substantially similar to the second voltage $V_B$ (another bias voltage), which is substantially similar to the first voltage $V_A$ (a reference voltage). That is, $V_A \approx V_B \approx V_C \approx VDD/2$.

Figure 8:
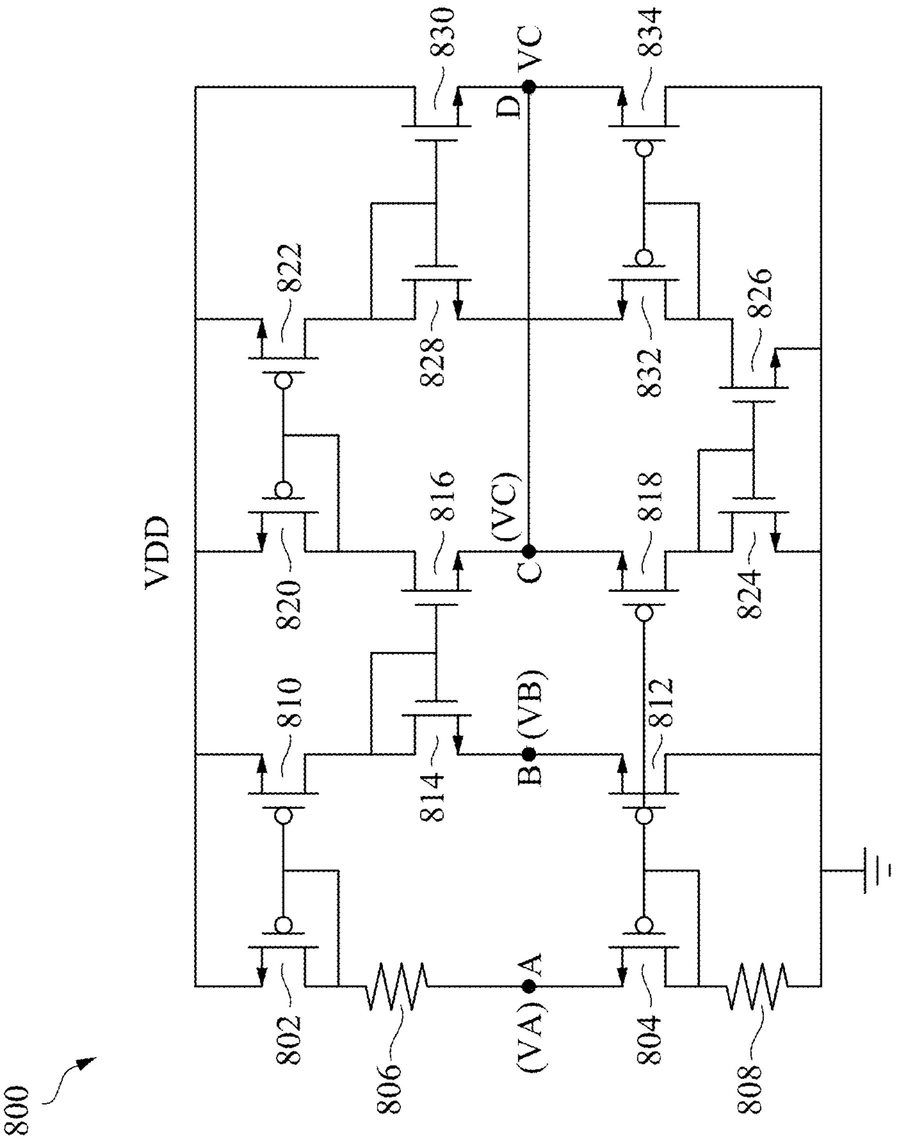

FIG. 8 illustrates an example circuit diagram of yet another bias provision circuit 800, in accordance with some embodiments. The bias provision circuit 800 is substantially similar to the bias provision circuit 700 (FIG. 7), except that the bias provision circuit 800 further includes some other components (or sections). Accordingly, the following discussion of the bias provision circuit 800 will be focused on the difference between the bias provision circuits 700 and 800. It should be understood that the circuit diagram of FIG. 8 is provided for illustrative purposes, and is not intended to limit the scope of the present disclosure. Accordingly, the bias provision circuit 800 shown in FIG. 8 can include any of various other components while remaining within the scope of the present disclosure.

As shown, in addition to a first diode-connected transistor 802, a second diode-connected transistor 804, a first impedance element 806, a second impedance element 808, and transistors 810 to 818 (which are substantially similar to the first diode-connected transistor 702, second diode-connected transistor 704, first impedance element 706, second impedance element 708, and transistors 710 to 718, respectively), the bias provision circuit 800 includes transistors 820, 822, 824, 826, 828, 830, 832, and 834. The transistor 820-822 and 832-834 can have the same conductive type (e.g., p-type), while the transistors 824-826 and 828-830 may have the opposite conductive type (e.g., n-type).

In some embodiments, the transistors 820 and 822 can have their gate terminals connected to each other, the transistors 824 and 826 can have their gate terminals connected to each other, the transistors 828 and 830 can have their gate terminals connected to each other, and the transistors 832 and 834 can have their gate terminals connected to each other. The pair of transistors 820-822, 824-826, 828-830, and 832-834 may each collectively operate as a current mirror. The transistor 830 and transistor 834 may each have one of its source/drain terminals connected to each other at a common node "D," which is connected to the common node C (thereby presenting the third voltage $V_C$). In some embodiments, the first diode-connected transistor 802 and the first impedance element 806 may operatively serve as a first reference section, the second diode-connected transistor 804 and the second impedance element 808 may operatively serve as a second reference section, the transistors 810-814 may operatively serve as a bias section, the transistors 816-828 and 832 may operatively serve as a gain section, the transistor 830 may operatively serve as a first driving section, and the transistor 834 may operatively serve as a second driving section. The first driving section can source the third voltage $V_C$, and the second driving section can sink the third voltage $V_C$. Further, the gain section is configured to provide an enlarged $V_{gs}$ swing for the driving section that sources/sinks a bias voltage during a transition state, which advantageously improves buffer capability of the driving section, according to various embodiments of the present disclosure. The third voltage $V_C$ (a bias voltage) can be substantially similar to the second voltage $V_B$ (another bias voltage), which is substantially similar to the first voltage $V_A$ (a reference voltage). That is, $V_A \approx V_B \approx V_C = VDD/2$.

Figure 10:
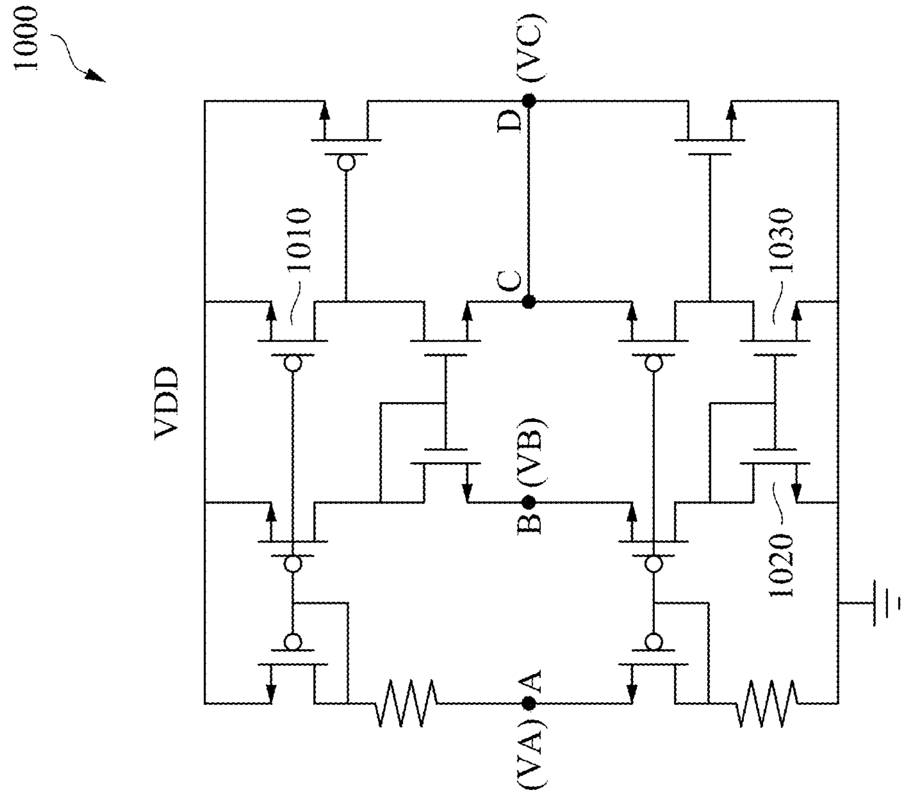
Figure 9:
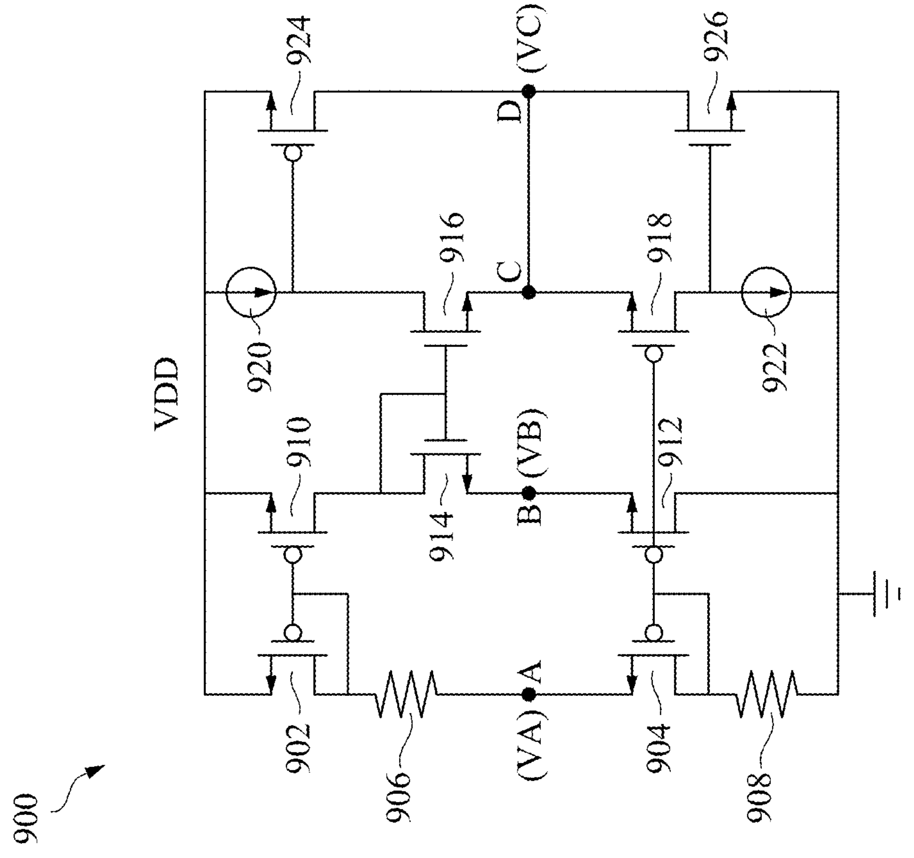

FIG. 9 illustrates an example circuit diagram of yet another bias provision circuit 900, in accordance with some embodiments. The bias provision circuit 900 is substantially similar to the bias provision circuit 700 (FIG. 7), except that the bias provision circuit 900 further includes some other components (or sections). FIG. 10 illustrates another example circuit diagram, with some of the components of the bias provision circuit 900 implemented down to a transistor level. Accordingly, the following discussion of the bias provision circuit 900/1000 will be focused on the difference between the bias provision circuits 700 and 900/1000. It should be understood that the circuit diagrams of FIGS. 9-10 are provided for illustrative purposes, and are not intended to limit the scope of the present disclosure. Accordingly, the bias provision circuit 900 (FIG. 9) and bias provision circuit 1000 (FIG. 10) can each include any of various other components while remaining within the scope of the present disclosure.

As shown, in addition to a first diode-connected transistor 902, a second diode-connected transistor 904, a first impedance element 906, a second impedance element 908, and transistors 910 to 918 (which are substantially similar to the first diode-connected transistor 702, second diode-connected transistor 704, first impedance element 706, second impedance element 708, and transistors 710 to 718, respectively), the bias provision circuit 900 includes a first current source 920, a second current source 922, and transistors 924 and 926. The first current source 920 can be formed by transistor 1010, and the second current source 922 can be formed by transistors 1020 and 1030, as shown in FIG. 10. The transistors 924 and 1010 can have the same conductive type (e.g., p-type), while the transistor 1020-1030 may have the opposite conductive type (e.g., n-type).

In some embodiments, the first diode-connected transistor 902 and the first impedance element 906 may operatively serve as a first reference section, the second diode-connected transistor 904 and the second impedance element 908 may operatively serve as a second reference section, the transistors 910-914 and the current source 922, in part (e.g., the transistor 1020), may operatively serve as a bias section, the current sources 920-922, in part (e.g., the transistors 1010 and 1030), and transistors 916-918 may operatively serve as a gain section, the transistor 924 may operatively serve as a first driving section, and the transistor 926 may operatively serve as a second driving section. The first driving section can source the third voltage $V_C$, and the second driving section can sink the third voltage $V_C$. Further, the gain section is configured to provide an enlarged $V_{gs}$ swing for the driving section that sources/sinks a bias voltage during a transition state, which advantageously improves buffer capability of the driving section, according to various embodiments of the present disclosure. The third voltage $V_C$ (a bias voltage) can be substantially similar to the second voltage $V_B$ (another bias voltage), which is substantially similar to the first voltage $V_A$ (a reference voltage). That is, $V_A \approx V_B \approx V_C \approx VDD/2$.

FIGS. 11, 12, 13, 14, and 15 respectively illustrate example circuit diagrams of bias provision circuits 1100, 1200, 1300, 1400, and 1500, in accordance with some embodiments. The bias provision circuits 1100 to 1500 are each coupled between supply voltages VDD and ground. The bias provision circuit 1100 of FIG. 11 further includes another bias section and another driving section, when compared to the bias provision circuit 100 (FIG. 1). As such, the bias provision circuit 1100 can provide a fraction of the difference between the supply voltages that is less than VDD/2, e.g., VDD/3, and/or its multiple, e.g., 2×VDD/3. Further, the bias provision circuits 1200 to 1500 (FIGS. 12 to 15) are each substantially similar to the bias provision circuit 1100, and thus, the following discussion of the bias provision circuits 1200 to 1500 will be focused on the difference. It should be understood that the circuit diagrams of FIGS. 11-15 are merely provided for illustrative purposes, and are not intended to limit the scope of the present disclosure. Accordingly, the bias provision circuits 1100-1500 shown in FIGS. 11-15 can each include any of various other components while remaining within the scope of the present disclosure.

Figure 11:
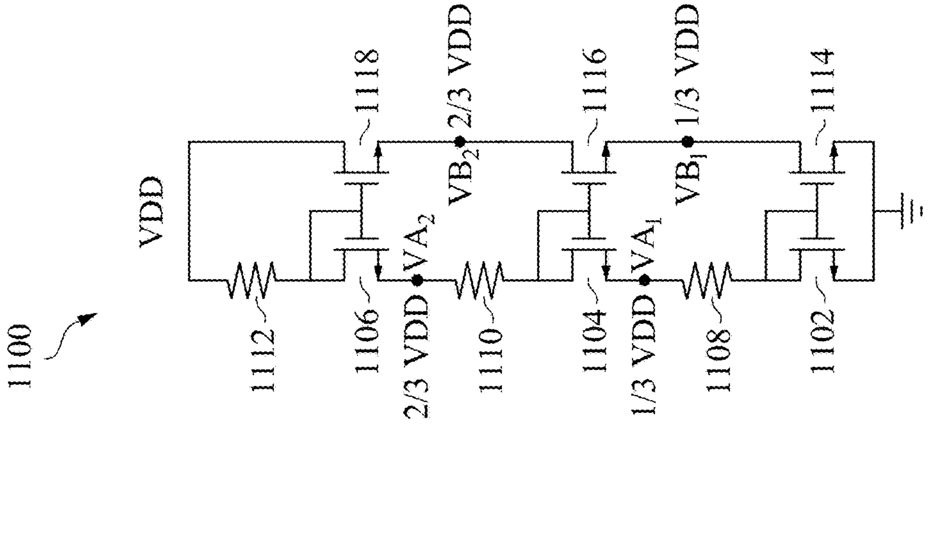

Referring first to FIG. 11, the bias provision circuit 1100 includes a first diode-connected transistor 1102, a second diode-connected transistor 1104, a third diode-connected transistor 1106, a first impedance element 1108, a second impedance element 1110, a third impedance element 1112, a first transistor 1114, a second transistor 1116, and a third transistor 1118. In some embodiments, the first impedance element 1108 to the third impedance element 1112 can each include a resistor, a transistor, a diode, or any other element that can provide impedance for the bias provision circuit 1100.

In the illustrative example of FIG. 11, the first impedance element 1108 is implemented as a first resistor, the second impedance element 1110 is implemented as a second resistor, and the third impedance element 1112 is implemented as a third resistor, wherein the first to third resistors have an identical resistance. In some embodiments, the first diode-connected transistor 1102 to the third diode-connected transistor 1106 have an identical conductive type, e.g., all in n-type in the example of FIG. 11. Further, the first transistor 1114 and the first diode-connected transistor 1102 have the same conductive type, the second transistor 1116 and the second diode-connected transistor 1104 have the same conductive type, and the third transistor 1118 and the third diode-connected transistor 1106 have the same conductive type.

The bias provision circuit 1100 has its components coupled between a first supply voltage (e.g., VDD) and a second supply voltage (e.g., ground). For example, the impedance element 1112 has a first terminal connected to VDD and a second terminal connected to a first source/drain terminal of the diode-connected transistor 1106, which is also connected to a gate terminal of the diode-connected transistor 1106; a second source/drain terminal of the diode-connected transistor 1106 is connected to a first terminal of the impedance element 1110 at a common node "A2," which presents a first voltage "$V_{A2}$;" the impedance element 1110 further has a second terminal connected to a first source/drain terminal of the diode-connected transistor 1104, which is also connected to a gate terminal of the diode-connected transistor 1104; a second source/drain terminal of the second diode-connected transistor 1104 is connected to a first terminal of the impedance element 1108 at a common node "A1," which presents a second voltage "$V_{A1}$;" the impedance element 1108 further has a second terminal connected to a first source/drain terminal of the diode-connected transistor 1102, which is also connected to a gate terminal of the diode-connected transistor 1102; and a second source/drain terminal of the diode-connected transistor 1102 is connected to ground. Further, the transistor 1118 has its gate terminal connected to the gate terminal of the diode-connected transistor 1106, with its first and second source/drain terminals connected to VDD and connected at a common node "B2," which presents a third voltage "$V_{B2}$," respectively; the transistor 1116 has its gate terminal connected to the gate terminal of the diode-connected transistor 1104, with its first and second source/drain terminals connected at the common node B2 and at a common node "B1," which presents a fourth voltage "$V_{B1}$," respectively; and the transistor 1114 has its gate terminal connected to the gate terminal of the diode-connected transistor 1102, with its first and second source/drain terminals connected at the common node B1 and connected to ground, respectively.

In some embodiments, the transistor 1114 and the diode-connected transistor 1102 may collectively operate as a current mirror, the transistor 1116 and the diode-connected transistor 1104 may collectively operate as another current mirror, and the transistor 1118 and the diode-connected transistor 1108 may collectively operate as yet another current mirror. With the impedance elements 1108 to 1112 having the same resistance or otherwise impedance, the voltage $V_{A1}$, which may sometimes be referred to as a reference voltage, can be configured as around VDD/3, and the voltage $V_{A2}$, which may sometimes be referred to as another reference voltage, can be configured as around 2×VDD/3. Further, with the transistor 1114 and the diode-connected transistor 1102 having the same threshold voltage, the transistor 1116 and the diode-connected transistor 1104 having the same threshold voltage, and the transistor 1118 and the diode-connected transistor 1106 having the same threshold voltage, the voltage $V_{B1}$, which may sometimes be referred to as a bias voltage, can be substantially similar to the (reference) voltage $V_{A1}$. That is, $V_{A1} \approx V_{B1} \approx$ VDD/3. Similarly, the voltage $V_{B2}$, which may sometimes be referred to as another bias voltage, can be substantially similar to the (reference) voltage $V_{A2}$. That is, $V_{A2} \approx V_{B2} \approx 2\times$VDD/3.

In some embodiments, the diode-connected transistor 1102 and the impedance element 1108 may operatively serve as a first reference section coupled to a first driving section formed by the transistor 1114; the diode-connected transistor 1104 and the impedance element 1110 may operatively serve as a second reference section coupled to a second driving section formed by the transistor 1116; and the diode-connected transistor 1106 and the impedance element 1112 may operatively serve as a third reference section coupled to a third driving section formed by the transistor 1118. With the first to third reference sections being substantially similar to one another, the voltage difference across VDD and ground can be equally divided into three units, each of which is equal to VDD/3. Further, the first reference section provides one unit of VDD/3 at the common node A1, and the first and second reference sections provide two units of VDD/3 at the common node A2.

Figure 12:
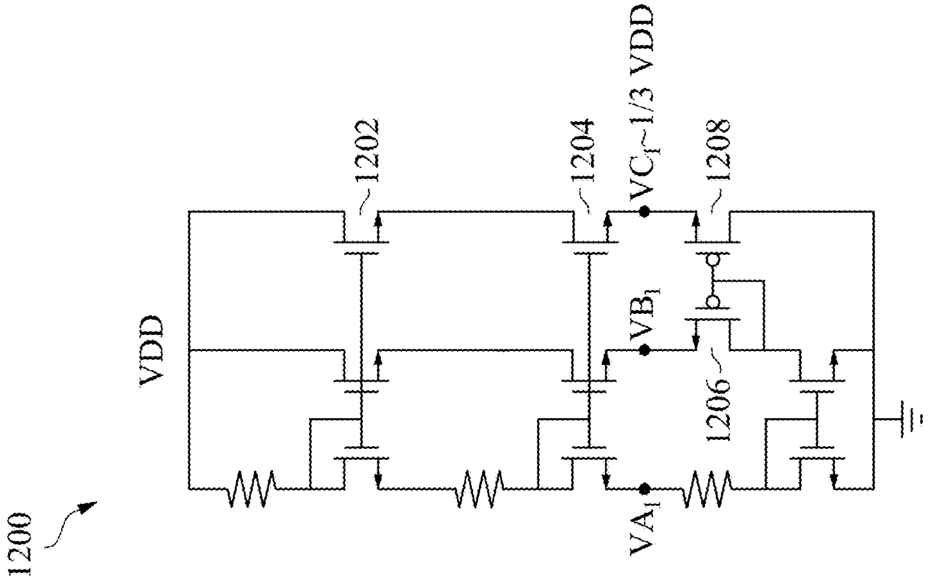

Referring next to FIG. 12, in addition to the components shown in FIG. 11 (the diode-connected transistors 1102 to 1106, the impedance elements 1108 to 1112, the transistors 1114 to 1118), the bias provision circuit 1200 includes transistors 1202, 1204, 1206, and 1208. The transistor 1202 may have its gate terminal connected to the respective gate terminals of the transistors 1118 and 1106. The transistor 1204 may have its gate terminal connected to the respective gate terminals of the transistors 1116 and 1104. The transistors 1206 and 1208, with their respective gate terminals connected to each other, may serve as a current mirror. In some embodiments, the transistors 1202 and 1204 have the same conductive type as the transistors 1106 and 1118 (e.g., n-type), while the transistors 1206 and 1208 have the opposite conductive type (e.g., p-type). In some embodiments, the bias provision circuit 1200 can provide at least a bias voltage equal to the reference voltage $V_{A1}$ or $V_{B1}$, VDD/3, at a common node between the transistor 1204 and transistor 1208.

Figure 13:
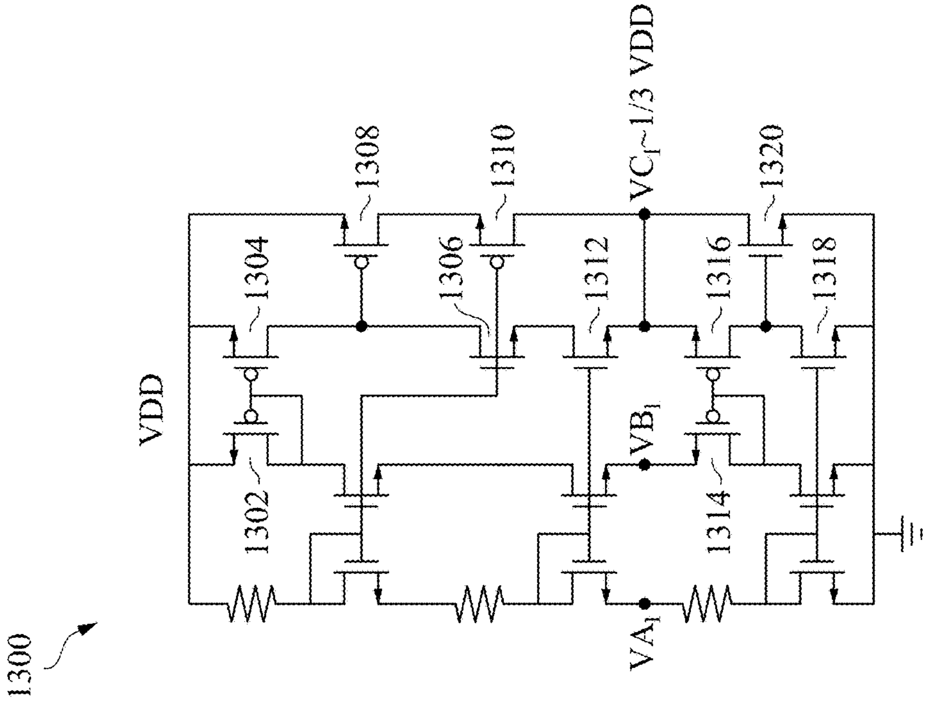

Referring next to FIG. 13, in addition to the components shown in FIG. 11 (the diode-connected transistors 1102 to 1106, the impedance elements 1108 to 1112, the transistors 1114 to 1118), the bias provision circuit 1300 includes transistors 1302, 1304, 1306, 1308, 1310, 1312, 1314, 1316, 1318, and 1320. The transistors 1302 and 1304, with their gate terminals connected to each other, may serve as a current mirror. The transistor 1308 may have its gate terminal connected to the respective gate terminals of the transistors 1118 and 1106. The transistors 1306 and 1310 may each have its gate terminal connected to the respective gate terminals of the transistors 1106 and 1118. The transistor 1312 may have its gate terminal connected to the respective gate terminals of the transistors 1104 and 1116. The transistors 1314 and 1316, with their gate terminals connected to each other, may serve as another current mirror. The transistor 1318 may have its gate terminal connected to the respective gate terminals of the transistors 1102 and 1114. The transistor 1320 may have its gate terminal connected to a common node between the transistors 1316 and 1318. In some embodiments, the transistors 1306, 1312, 1318, and 1320 have the same conductive type as the transistors 1106 and 1118 (e.g., n-type), while the transistors 1302, 1304, 1308, 1310, 1314, and 1316 have the opposite conductive type (e.g., p-type). In some embodiments, the bias provision circuit 1300 can provide at least a bias voltage equal to the reference voltage $V_{A1}$ or $V_{B1}$, VDD/3, at a common node between the transistor 1310 and transistor 1320.

Figure 14:
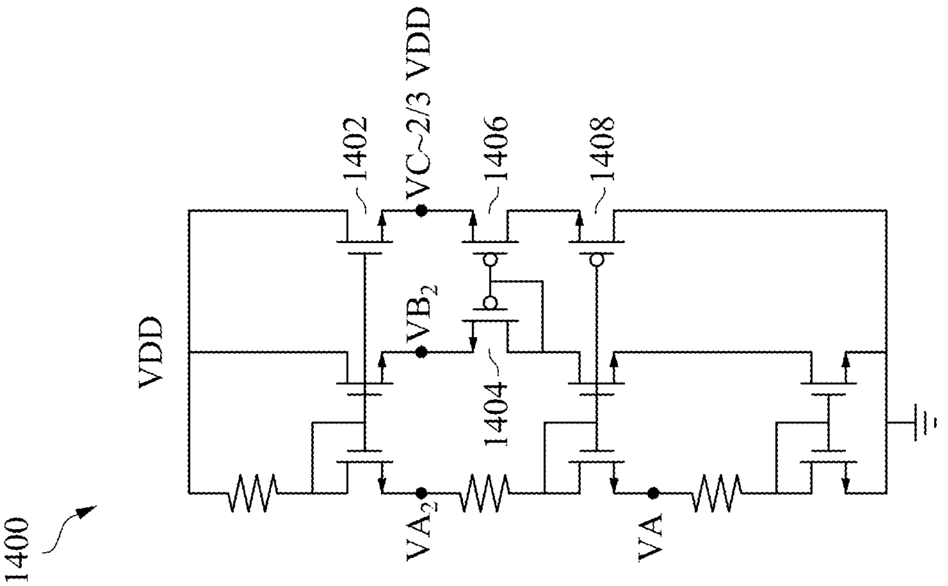

Referring next to FIG. 14, in addition to the components shown in FIG. 11 (the diode-connected transistors 1102 to 1106, the impedance elements 1108 to 1112, the transistors 1114 to 1118), the bias provision circuit 1400 includes transistors 1402, 1404, 1406, and 1408. The transistor 1402 may have its gate terminal connected to the respective gate terminals of the transistors 1118 and 1106. The transistor 1408 may have its gate terminal connected to the respective gate terminals of the transistors 1116 and 1104. The transistors 1404 and 1406, with their respective gate terminals connected to each other, may serve as a current mirror. In some embodiments, the transistor 1402 has the same conductive type as the transistors 1106 and 1118 (e.g., n-type), while the transistors 1404 to 1408 have the opposite conductive type (e.g., p-type). In some embodiments, the bias provision circuit 1400 can provide at least a bias voltage equal to the reference voltage $V_{A2}$ or $V_{B2}$, 2×VDD/3, at a common node between the transistor 1402 and transistor 1406.

Figure 15:
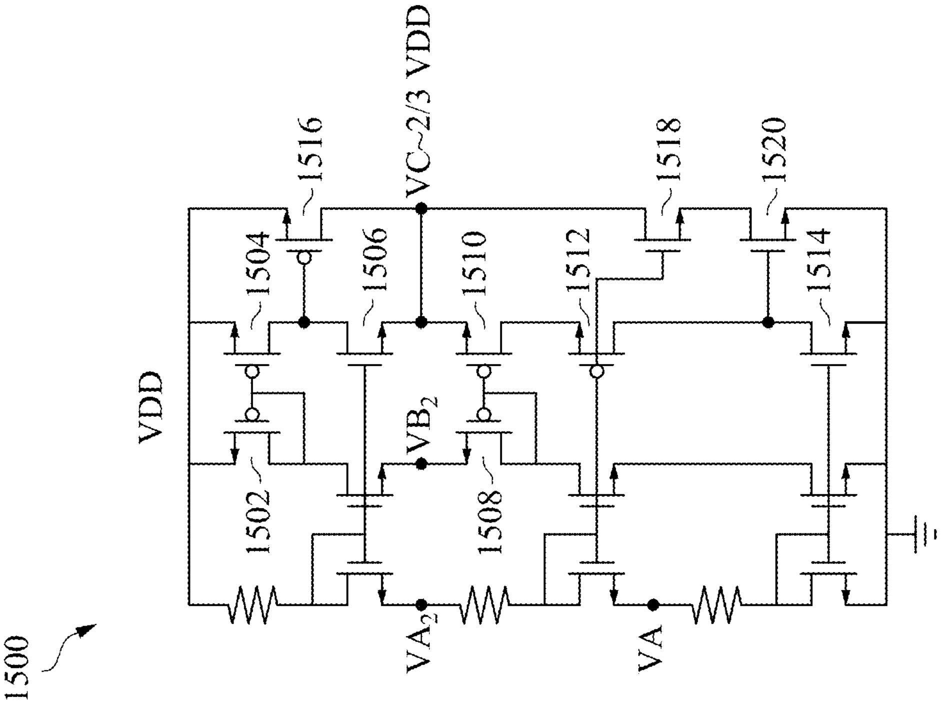

Referring next to FIG. 15, in addition to the components shown in FIG. 11 (the diode-connected transistors 1102 to 1106, the impedance elements 1108 to 1112, the transistors 1114 to 1118), the bias provision circuit 1500 includes transistors 1502, 1504, 1506, 1508, 1510, 1512, 1514, 1516, 1518, and 1520. The transistors 1502 and 1504, with their respective gate terminals connected to each other, may serve as a current mirror. The transistor 1506 may have its gate terminal connected to the respective gate terminals of the transistors 1118 and 1106. The transistor 1516 may have its gate terminal connected to a common node between the transistors 1504 and 1506. The transistors 1508 and 1510, with their respective gate terminals connected to each other, may serve as a current mirror. The transistor 1512 may have its gate terminal connected to the respective gate terminals of the transistors 1116 and 1104. The transistor 1518 may have its gate terminal connected to the respective gate terminals of the transistors 1116 and 1104. The transistor 1514 may have its gate terminal connected to the respective gate terminals of the transistors 1114 and 1102. The transistor 1520 may have its gate terminal connected to a common node between the transistors 1512 and 1514. In some embodiments, the transistors 1506, 1514, 1518, and 1520 have the same conductive type as the transistors 1106 and 1118 (e.g., n-type), while the transistors 1502, 1504, 1508, 1510, and 1516 have the opposite conductive type (e.g., p-type). In some embodiments, the bias provision circuit 1500 can provide at least a bias voltage equal to the reference voltage $V_{A2}$ or $V_{B2}$, 2×VDD/3, at a common node between the transistor 1516 and transistor 1518.

Figure 16:
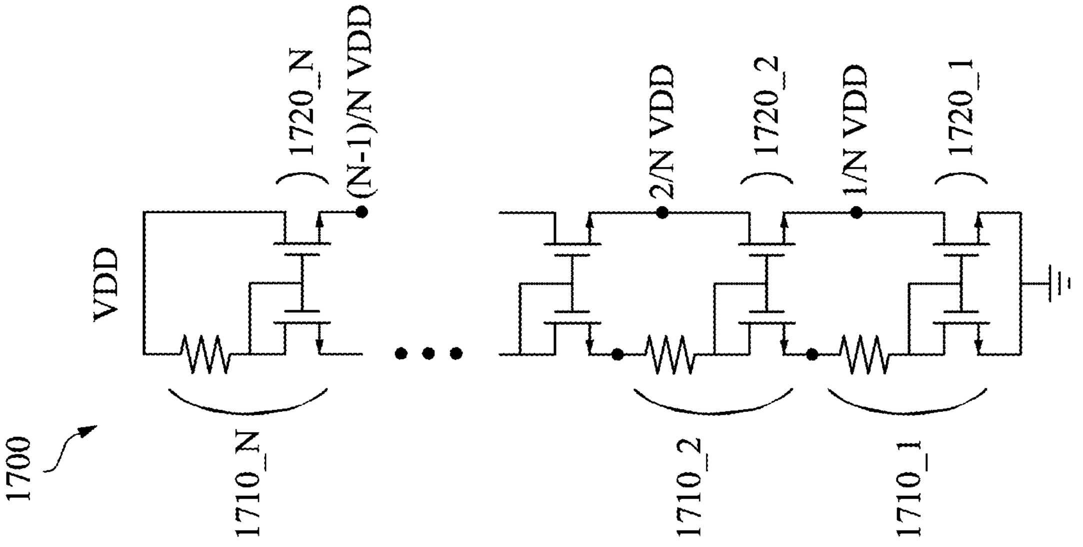

FIG. 16 illustrates an example circuit diagram of a bias provision circuit 1700, in accordance with some embodiments. The bias provision circuit 1700 is coupled between supply voltages VDD and ground. Further, the bias provision circuit 1700 of FIG. 16 is substantially similar to the bias provision circuit 100 shown in FIG. 1, except that the bias provision circuit 1700 includes N reference sections and N driving/bias sections, where N may be equal to or greater than 3. As such, the bias provision circuit 1700 can provide multiple fractional voltages of the supply voltage difference VDD, each of which is a multiple of VDD/N.

For example, the bias provision circuit 1700 includes N bias sections, 1710_1, 1710_2 . . . 1710_N, and corresponding driving/bias sections, 1720_1, 1720_2 . . . 1720_N. Similar to the bias provision circuit 100 (FIG. 1), each of the reference sections 1710_1 to 1710_N includes an impedance element and a diode-connected transistor, and each of the driving/bias sections 1720_1 to 1720_N includes a transistor having a threshold voltage similar to the corresponding diode-connected transistor. Further, the diode-connected transistors of those N reference sections can have the same conductive type (e.g., n-type) as the transistors of the N driving sections. Accordingly, as shown in FIG. 16, a variety of fractional voltages, e.g., VDD/N, 2×VDD/N . . . (N−1)×VDD/N can be provided at common nodes between adjacent driving/bias sections, respectively.

Figure 17:
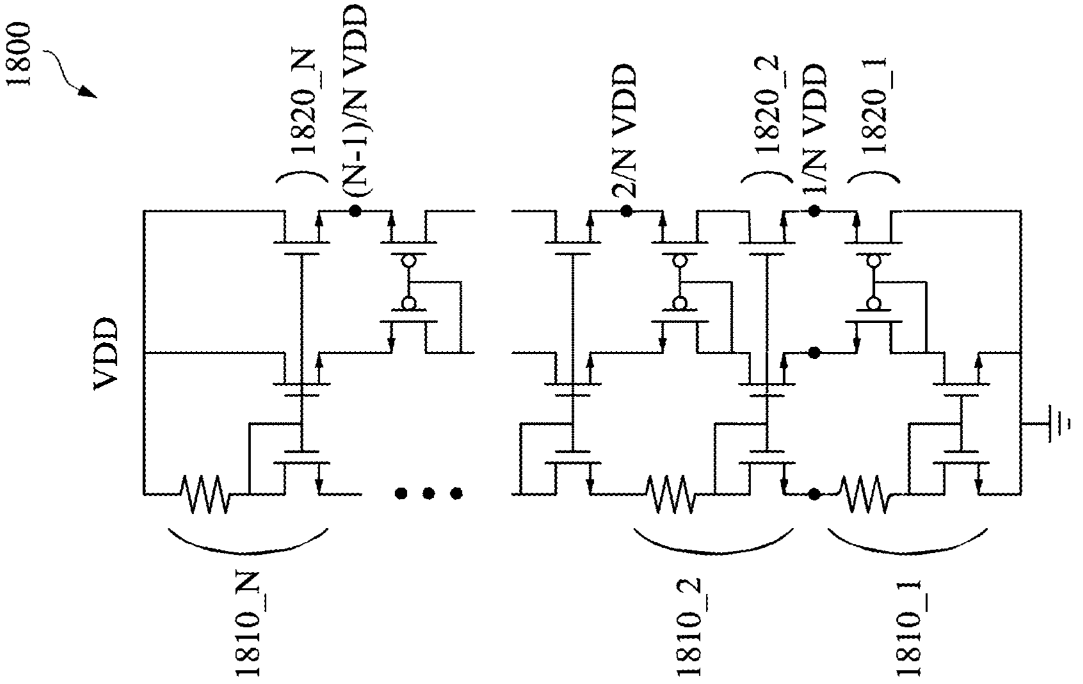

FIG. 17 illustrates an example circuit diagram of a bias provision circuit 1800, in accordance with some embodiments. The bias provision circuit 1800 is coupled between supply voltages VDD and ground. Further, the bias provision circuit 1800 of FIG. 17 is substantially similar to the bias provision circuit 200 shown in FIG. 2, except that the bias provision circuit 1800 includes N reference sections and N driving sections, where N may be equal to or greater than 3. As such, the bias provision circuit 1800 can provide multiple fractional voltages of the supply voltage difference VDD, each of which is a multiple of VDD/N.

For example, the bias provision circuit 1800 includes N bias sections, 1810_1, 1810_2 . . . 1810_N, and corresponding driving sections, 1820_1, 1820_2 . . . 1820_N. Similar to the bias provision circuit 200 (FIG. 2), each of the bias sections 1810_1 to 1810_N includes an impedance element and a diode-connected transistor, and each pair of the driving sections 1820_1 to 1820_N includes a p-type transistor and an n-type transistor. Further, the diode-connected transistors of those N reference sections can have the same conductive type (e.g., n-type). Accordingly, as shown in FIG. 17, a variety of fractional voltages, e.g., VDD/N, 2×VDD/N . . . (N−1)×VDD/N can be provided at common nodes between adjacent driving sections that have the opposite conductive types of transistors, respectively.

Figure 18:
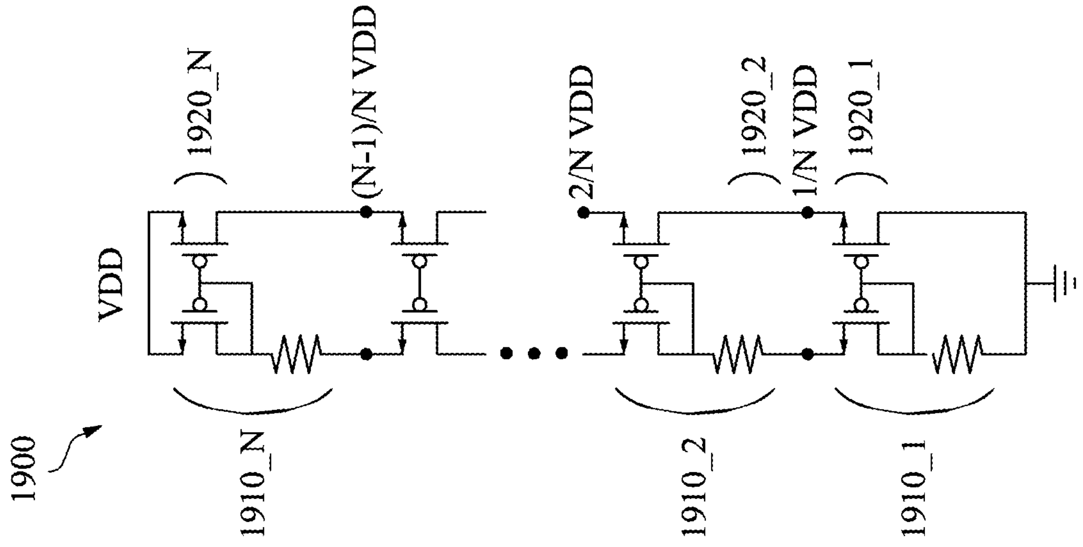

FIG. 18 illustrates an example circuit diagram of a bias provision circuit 1900, in accordance with some embodiments. The bias provision circuit 1900 is coupled between supply voltages VDD and ground. Further, the bias provision circuit 1900 of FIG. 18 is substantially similar to the bias provision circuit 600 shown in FIG. 6, except that the bias provision circuit 1900 includes N reference sections and N driving/bias sections, where N may be equal to or greater than 3. As such, the bias provision circuit 1900 can provide multiple fractional voltages of the supply voltage difference VDD, each of which is a multiple of VDD/N.

For example, the bias provision circuit 1900 includes N bias sections, 1910_1, 1910_2 . . . 1910_N, and corresponding driving/bias sections, 1920_1, 1920_2 . . . 1920_N. Similar to the bias provision circuit 600 (FIG. 6), each of the reference sections 1910_1 to 1910_N includes an impedance element and a diode-connected transistor, and each of the driving/bias sections 1920_1 to 1920_N includes a transistor having a threshold voltage similar to the corresponding diode-connected transistor. Further, the diode-connected transistors of those N reference sections can have the same conductive type (e.g., p-type) as the transistors of the N driving sections. Accordingly, as shown in FIG. 18, a variety of fractional voltages, e.g., VDD/N, 2×VDD/N . . . (N−1)×VDD/N can be provided at common nodes between adjacent driving/bias sections, respectively.

Figure 19:
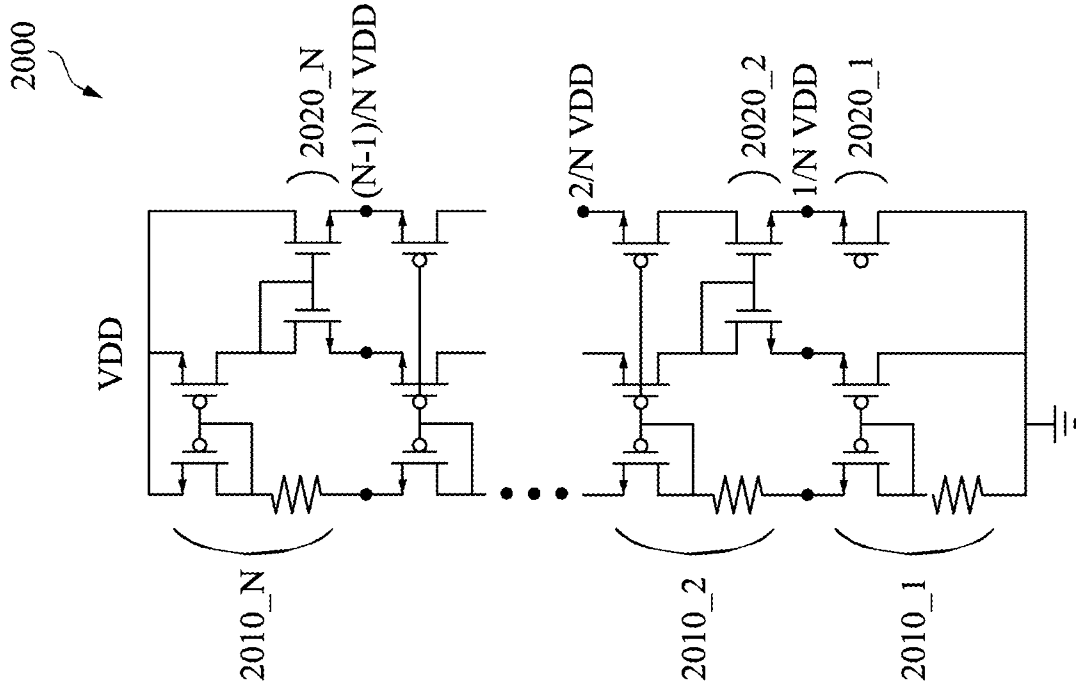

FIG. 19 illustrates an example circuit diagram of a bias provision circuit 2000, in accordance with some embodiments. The bias provision circuit 2000 is coupled between supply voltages VDD and ground. Further, the bias provision circuit 2000 of FIG. 19 is substantially similar to the bias provision circuit 700 shown in FIG. 7, except that the bias provision circuit 2000 includes N reference sections and N driving sections, where N may be equal to or greater than 3. As such, the bias provision circuit 2000 can provide multiple fractional voltages of the supply voltage difference VDD, each of which is a multiple of VDD/N.

For example, the bias provision circuit 2000 includes N bias sections, 2010_1, 2010_2 . . . 2010_N, and corresponding driving sections, 2020_1, 2020_2 . . . 2020_N. Similar to the bias provision circuit 700 (FIG. 7), each of the bias sections 2010_1 to 2010_N includes an impedance element and a diode-connected transistor, and each pair of the driving sections 2020_1 to 2020_N includes a p-type transistor and an n-type transistor. Further, the diode-connected transistors of those N reference sections can have the same conductive type (e.g., p-type). Accordingly, as shown in FIG. 19, a variety of fractional voltages, e.g., VDD/N, 2×VDD/N . . . (N−1)×VDD/N can be provided at common nodes between adjacent driving sections that have the opposite conductive types of transistors, respectively.

Figure 20:
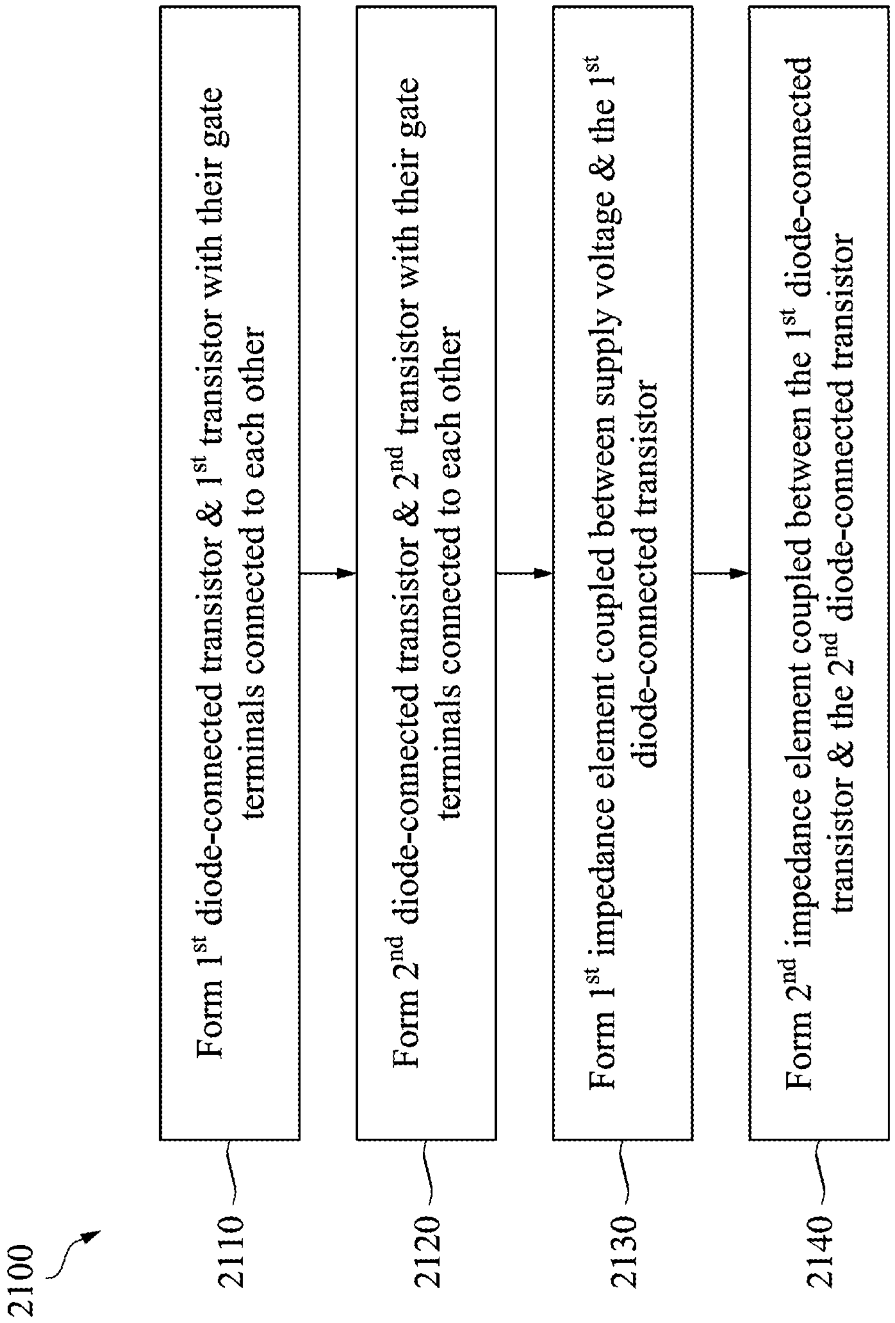
FIG. 20 illustrate a flow chart of an example method for forming a bias provision circuit, in accordance with some embodiments.

FIG. 20 illustrates a flow chart of an example method 2100 for forming a bias provision circuit, in accordance with some embodiments. For example, operations of the method 2100 can be utilized to form the bias provision circuit 100 shown in FIG. 1, e.g., including a pair of diode-connected transistors, a pair of impedance elements, and a pair of (driving/bias) transistors. However, it should be noted that the method 2100 is merely an example, and is not intended to limit the present disclosure. Thus, additional operations may be provided before, during, and/or after the method 2100 of FIG. 20, and that some other operations may only be briefly described herein.

The method 2100 starts with operation 2110 of forming a first diode-connected transistor and a first transistor, in which respective gate terminals of the first diode-connected transistor and the first transistor are connected to each other. Using the circuit diagram of FIG. 1 as a representative example, the first diode-connected transistor (e.g., 102) and the first transistor (e.g., 110) can be formed along the major surface of a substrate, which is sometimes referred to as part of front-end-of-line (FEOL) processing. Respective gate terminals, drain terminals, and source terminals of the transistors 102 and 110 can be formed along the major surface. Each of the transistors 102 and 110 can each be formed as at least one of the following structures, a gate-all-around (GAA) transistor, a complementary transistor, a FinFET, a planar transistor, or the like.

The method 2100 proceeds to operation 2120 of forming a second diode-connected transistor and a second transistor, in which respective gate terminals of the second diode-connected transistor and the second transistor are connected to each other. Continuing with the above example of FIG. 1, the second diode-connected transistor (e.g., 104) and the second transistor (e.g., 112) can be formed along the major surface of the same substrate. Formation of the transistors 104 and 112 can be part of the FEOL processing, in accordance with various embodiments. Respective gate terminals, drain terminals, and source terminals of the transistors 104 and 112 can be formed along the major surface. Each of the transistors 104 and 112 can each be formed as at least one of the following structures, a gate-all-around (GAA) transistor, a complementary transistor, a FinFET, a planar transistor, or the like. Further, the transistors 102 and 104 can have the same conductive type (e.g., formed from the same active region or from respective active regions that have the same conductive type), according to various embodiments of the present disclosure.

The method 2100 proceeds to operation 2130 of forming a first impedance element coupled between a supply voltage and a first source/drain terminal of the first diode-connected transistor, in which the first source/drain terminal and the gate terminal of the first diode-connected transistor are connected to each other. Still with the same example above, the first impedance element may be implemented as a resistor (e.g., 106). In some embodiments, the resistor 106 can be formed as a metal or poly resistor in one of a plurality of metallization layers above the major surface of the substrate, which is sometimes referred to as part of middle-end-of-line (MEOL) processing or back-end-of-line (BEOL) processing. The resistor 106 can have two terminals, one of which is electrically connected to a first one of the source or drain terminal of the transistor 102 and the other of which is electrically connected to a first supply voltage, VDD, which may be carried by a first interconnect structure formed through the BEOL processing. Further, the transistor 110 can have a first one of source or drain terminal electrically connected to that first interconnect structure, and a second one of source or drain terminal electrically connected to a first source or drain terminal of the transistor 112.

The method 2100 proceeds to operation 2140 of forming a forming a second impedance element coupled between a second source/drain terminal of the first diode-connected transistor and a first source/drain terminal of the second diode-connected transistor, in which the second source/drain terminal and the gate terminal of the second diode-connected transistor are connected to each other. Continuing with the above example, the second impedance element may be implemented as a resistor (e.g., 108). In some embodiments, the resistor 108 can be formed as another metal or poly resistor in one of the metallization layers above the major surface of the substrate. The resistor 108 can have two terminals, one of which is electrically connected to a second one of the source or drain terminal of the transistor 102 and the other of which is electrically connected to a first one of the source or drain terminal of the transistor 104. Further, a second one of the source or drain terminal of the transistor 104 is electrically connected to a second supply voltage, ground, which may be carried by a second interconnect structure formed through the BEOL processing. Further, the transistor 112 can have a second one of source or drain terminal electrically connected to that second interconnect structure.

In one aspect of the present disclosure, a bias provision circuit is disclosed. The circuit includes a first diode-connected transistor; a first impedance element connected between a first source/drain terminal of the first diode-connected transistor and a first supply voltage; a first transistor, wherein the first diode-connected transistor and the first transistor have their gate terminals connected to each other; a second diode-connected transistor; a second impedance element connected between a second source/drain terminal of the first diode-connected transistor and a first source/drain terminal of the second diode-connected transistor, with a second source/drain terminal of the second diode-connected transistor coupled to a second supply voltage; and a second transistor, wherein the second diode-connected transistor and the second transistor have their gate terminals connected to each other. The first diode-connected transistor and the second diode-connected transistor have a first conductive type.

In another aspect of the present disclosure, a bias provision circuit is disclosed. The circuit includes a first reference section and a second reference section connected to each other and coupled between a supply voltage and ground; and a first driving section and a second driving section coupled to the first reference section and the second reference section, respectively. The first reference section includes a first diode-connected transistor and a first resistor, the second reference section includes a second diode-connected transistor and a second resistor, the first driving section includes a first transistor, and the second driving section includes a second transistor. The first diode-connected transistor, the second diode-connected transistor, and the first transistor have a first conductive type, while the second transistor has a second conductive type opposite to the first conductive type.

In yet another aspect of the present disclosure, a method for forming a bias provision circuit is disclosed. The method includes forming a first diode-connected transistor and a first transistor, with their gate terminals connected to each other. The method includes forming a second diode-connected transistor and a second transistor, with their gate terminals connected to each other. The method includes forming a first impedance element coupled between a supply voltage and a first source/drain terminal of the first diode-connected transistor, the first source/drain terminal of the first diode-connected transistor and the gate terminal of the first diode-connected transistor are connected to each other. The method includes forming a second impedance element coupled between a second source/drain terminal of the first diode-connected transistor and a first source/drain terminal of the second diode-connected transistor, the second source/ drain terminal and the gate terminal of the second diode-connected transistor are connected to each other. The first diode-connected transistor and the second diode-connected transistor have a same conductive type.

As used herein, the terms "about" and "approximately" generally indicates the value of a given quantity that can vary based on a particular technology node associated with the subject semiconductor device. Based on the particular technology node, the term "about" can indicate a value of a given quantity that varies within, for example, 10-30% of the value (e.g., +10%, ±20%, or ±30% of the value).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A bias provision circuit, comprising:

a first diode-connected transistor;

a first impedance element connected between a drain terminal of the first diode-connected transistor and a first supply voltage;

a first transistor, wherein the first diode-connected transistor and the first transistor have their gate terminals connected to each other;

a second diode-connected transistor;

a second impedance element connected between a source terminal of the first diode-connected transistor and a drain terminal of the second diode-connected transistor with a source terminal of the second diode-connected transistor coupled to a second supply voltage; and a second transistor, wherein the second diode-connected transistor and the second transistor have their gate terminals connected to each other;

wherein the first diode-connected transistor and the second diode-connected transistor have a common conductive type;

wherein the source terminal of the second diode-connected transistor is directly connected to the second supply voltage.

2. The bias provision circuit of claim 1, wherein the second impedance element and the source terminal of the first diode-connected transistor are commonly connected at a first node presenting a first voltage, and the first transistor and the second transistor are commonly connected at a second node presenting a second voltage.

3. The bias provision circuit of claim 2, wherein the first voltage and the second voltage are each equal to a fraction of the first supply voltage.

4. The bias provision circuit of claim 3, wherein the fraction is equal to ½.

5. The bias provision circuit of claim 1, wherein the first diode-connected transistor is substantially similar to the second diode-connected transistor.

6. The bias provision circuit of claim 1, wherein the first impedance element includes a first resistor and the second impedance element includes a second resistor, and wherein the first resistor and the second resistor have a same resistance.

7. The bias provision circuit of claim 1, wherein the first transistor and the second transistor have the common conductive type.

8. The bias provision circuit of claim 1, wherein a voltage difference between the first supply voltage and the second supply voltage is VDD.

9. The bias provision circuit of claim 1, wherein a drain terminal of the first transistor is connected to the first supply voltage.

10. The bias provision circuit of claim 9, wherein a source terminal of the first transistor is connected to a drain terminal of the second transistor.

11. The bias provision circuit of claim 10, wherein the source terminal of the second diode-connected transistor and a source terminal of the second transistor are connected to the second supply voltage.

12. The bias provision circuit of claim 11, wherein the source terminal of the first diode-connected transistor, connected to the second impedance, presents a first voltage, and the connected source terminal of the first transistor and the drain terminal of the second transistor present a second voltage.

13. The bias provision circuit of claim 12, wherein the first voltage and the second voltage are each equal to a fraction of a voltage difference between the first supply voltage and the second supply voltage.

14. A bias provision circuit, comprising:

a first reference section and a second reference section connected to each other and coupled between a supply voltage and ground; and a first driving section and a second driving section coupled to the first reference section and the second reference section, respectively;

wherein the first reference section includes a first diode-connected transistor and a first resistor, the second reference section includes a second diode-connected transistor and a second resistor, the first driving section includes a first transistor, and the second driving section includes a second transistor; and wherein the first diode-connected transistor, the second diode-connected transistor, the first transistor, and the second transistor have a common conductive type;

wherein an output terminal of the second reference section is directly connected to ground.

15. The bias provision circuit of claim 14, wherein the first reference section and the second reference section are commonly connected at a first node presenting a first voltage, and the first transistor and the second transistor are commonly connected at a second node presenting a second voltage.

16. The bias provision circuit of claim 15, wherein the first voltage and the second voltage are each equal to a fraction of the supply voltage.

17. The bias provision circuit of claim 16, wherein the fraction is equal to ½.

18. The bias provision circuit of claim 14, wherein the first resistor and the second resistor have a same resistance.

19. A method for forming a bias provision circuit, comprising:

forming a first diode-connected transistor and a first transistor, with their gate terminals connected to each other;

forming a second diode-connected transistor and a second transistor, with their gate terminals connected to each other;

forming a first impedance element coupled between a supply voltage and a drain terminal of the first diode-connected transistor, the drain terminal of the first diode-connected transistor and the gate terminal of the first diode-connected transistor are connected to each other; and forming a second impedance element coupled between a source terminal of the first diode-connected transistor and a drain terminal of the second diode-connected transistor, the drain terminal and the gate terminal of the second diode-connected transistor are connected to each other;

wherein the first diode-connected transistor and the second diode-connected transistor have a same conductive type;

wherein the source terminal of the second diode-connected transistor is directly connected to the second supply voltage.

20. The method of claim 19, wherein the source terminal of the first diode-connected transistor and one terminal of the second impedance element are connected at a node presenting a voltage that is equal to a fraction of the supply voltage.

* * * * *